United States Patent
Goldberg et al.

(10) Patent No.: US 12,174,855 B2
(45) Date of Patent: Dec. 24, 2024

(54) INTERRUPTED SYNCHRONIZATION DETECTION AND RECOVERY

(71) Applicant: Dropbox, Inc., San Francisco, CA (US)

(72) Inventors: Isaac Goldberg, San Francisco, CA (US); John Lai, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 729 days.

(21) Appl. No.: 14/869,681

(22) Filed: Sep. 29, 2015

(65) Prior Publication Data
US 2017/0091253 A1 Mar. 30, 2017

(51) Int. Cl.
G06F 16/27 (2019.01)

(52) U.S. Cl.
CPC .................. *G06F 16/275* (2019.01)

(58) Field of Classification Search
CPC ......... G06F 17/30368; G06F 17/30371; G06F 17/30581; G06F 17/30144; G06F 17/30551; G06F 16/275
USPC ... 707/625, 610, 695, 803, 999.01, 999.002, 707/17.005
See application file for complete search history.

(56) References Cited

U.S. PATENT DOCUMENTS

| | | | | |
|---|---|---|---|---|
| 2002/0156798 A1* | 10/2002 | Larue | ...................... | G06F 16/27 |
| 2004/0205263 A1* | 10/2004 | Sivaraman | ........ | G06F 17/30578 710/21 |
| 2009/0063660 A1* | 3/2009 | Fleischman | ............ | G11B 27/10 709/219 |
| 2009/0125571 A1* | 5/2009 | Kiilerich | ............. | H04L 67/1095 |
| 2009/0327358 A1* | 12/2009 | Lukiyanov | ........ | G06F 17/30038 |
| 2011/0087802 A1* | 4/2011 | Witriol | .................... | G06F 16/27 709/248 |
| 2012/0036212 A1* | 2/2012 | McCarthy | ........... | H04L 67/1097 709/206 |
| 2012/0079095 A1* | 3/2012 | Evans | ................. | H04L 67/1095 709/224 |
| 2014/0181014 A1* | 6/2014 | Balakrishnan | .... | G06F 17/30312 707/611 |
| 2014/0188869 A1* | 7/2014 | Beckmann | ........ | G06F 17/30079 707/736 |
| 2014/0189063 A1* | 7/2014 | Carriero | .............. | H04L 67/1095 709/219 |
| 2014/0201145 A1* | 7/2014 | Dorman | ................... | G06F 16/27 707/634 |
| 2014/0289360 A1* | 9/2014 | Mahkovec | ........ | G06F 17/30899 709/217 |
| 2015/0278168 A1* | 10/2015 | Hawa | .................... | G06F 16/275 715/205 |

(Continued)

*Primary Examiner* — Tony Mahmoudi
*Assistant Examiner* — Kamal K Dewan
(74) *Attorney, Agent, or Firm* — Polsinelli PC

(57) ABSTRACT

An example computer implemented method for updating a first version of a content item on a client device. The example method includes recording an indicator that the first version is going to be updated to a second version of the content item. The computer can then begin updating the first version of the content item to the second version of the content item. Next, the computer can determine that the updating of the content item was interrupted. The computer can then determine if the second version of the content item is the same version as a current version of the content item. The computer can then change a description in a cache and the indicator accordingly.

20 Claims, 6 Drawing Sheets

(56) References Cited

U.S. PATENT DOCUMENTS

| | | | | |
|---|---|---|---|---|
| 2015/0339113 A1* | 11/2015 | Dorman | .................. | H04L 67/10 |
| | | | | 717/169 |
| 2016/0057317 A1* | 2/2016 | Zhao | ...................... | H04N 21/00 |
| | | | | 348/515 |
| 2018/0011873 A1* | 1/2018 | Melahn | ............. | G06F 17/30174 |
| 2019/0213204 A1* | 7/2019 | Hawa | .................. | H04L 67/1095 |
| 2021/0136172 A1* | 5/2021 | Ionescu | ............... | G06F 16/2474 |

* cited by examiner

INTERRUPTED SYNCHRONIZATION DETECTION AND RECOVERY

BACKGROUND

Online-synchronized content management systems facilitate the synchronization of content items with client devices. There are times when something might interrupt a synchronization procedure of a content item between a client device and a content management system. This interruption can be the result of a faulty network connection, frozen software, a crashed system, user action, etc. When the client device comes back online after the interruption and resumes the synchronization procedure, various undesirable outcomes might result.

For example, if the content item successfully updated to a newer version but the client device did not take note of the updating in a cache, the client device might flag the content item as a new version and unnecessarily attempt to commit (e.g., upload) the content item to the content management system.

Another undesirable outcome can result if the interruption in the synchronization procedure corrupts the content item. The client device might then attempt to commit the (corrupted) content item to the content management system. The client device might indicate during the commit that the content item has a prior successfully synchronized version. In such a situation, the content management system might update its (uncorrupted) version to the (corrupted) content item it receives from the client device.

The foregoing limitations of available systems can result in loss of data and the unnecessary use of synchronization resources.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for detecting and recovering from an interrupted synchronization operation.

An example computer implemented method for updating a first version of a content item on a client device. The example method includes recording an indicator that the first version is going to be updated to a second version of the content item. The computer can then begin updating the first version of the content item to the second version of the content item. Next, the computer can determine that the updating of the content item was interrupted. The computer can then determine if the second version of the content item is the same version as a current version of the content item. The computer can then change a description in a cache and the indicator accordingly.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a way to detect a synchronization interruption and recover from the synchronization interruption. For example, there are times when something might interrupt a synchronization procedure of a content item between a client device and a content management system. When the client device comes back online after the interruption and resumes the synchronization procedure, various undesirable outcomes might result. For example, the content item might have become corrupted during the synchronization operation and might be identified as a new version that should be synchronized with the content management system. In certain cases, the content management system might replace an uncorrupted version of the content item with the corrupted version. Additionally, if the content item synchronized correctly, resources might unnecessarily be expended in synchronizing the version of the content item stored on the client device and the version stored on the content management system. To overcome some of these limitations, an indicator can be stored describing a synchronization operation that the client synchronization module is about to perform. If a synchronization interruption occurs, the client synchronization module can then, using the indicator, determine if the content item was successfully synchronized, partially synchronized (resulting in a corrupted version), or if the content item is unchanged.

Figure 1A:
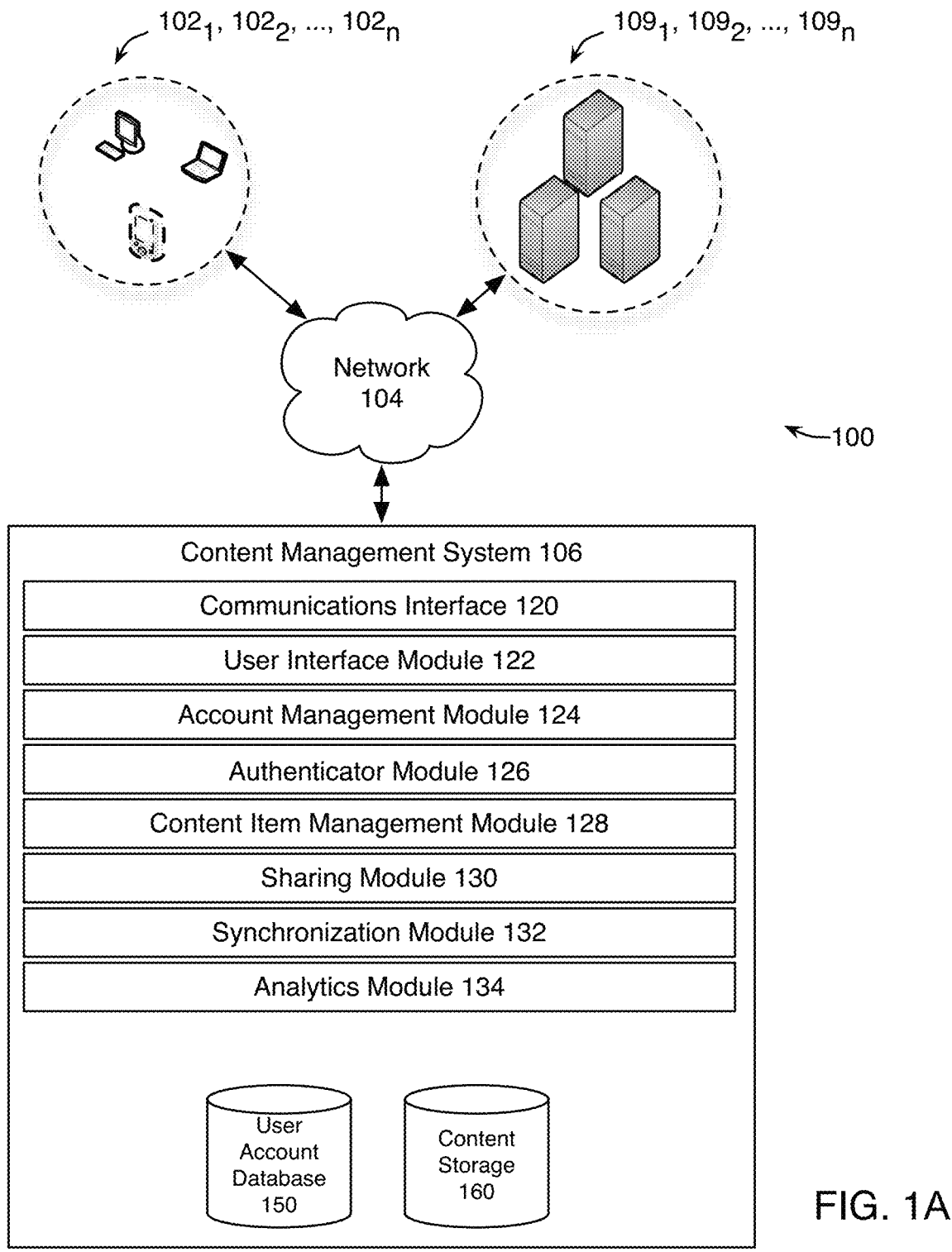
FIGS. 1A and 1B show example configurations of devices and a network in accordance with some embodiments.

With respect to implementing various embodiments of the disclosed technology, an example system configuration 100 is shown in FIG. 1A, wherein electronic devices communicate via a network for purposes of exchanging content and other data. The system can be configured for use on a wide area network such as that illustrated in FIG. 1A. However, the present principles are applicable to a wide variety of network configurations that facilitate the intercommunication of electronic devices. For example, each of the components of system 100 in FIG. 1A can be implemented in a localized or distributed fashion in a network.

In system 100, a user can interact with content management system 106 (e.g., an online synchronized content management system) through client devices $102_1$, $102_2$, ..., $102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store user profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_{i's}$ file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device 102$_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, . . . , 109$_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

Figure 1B:
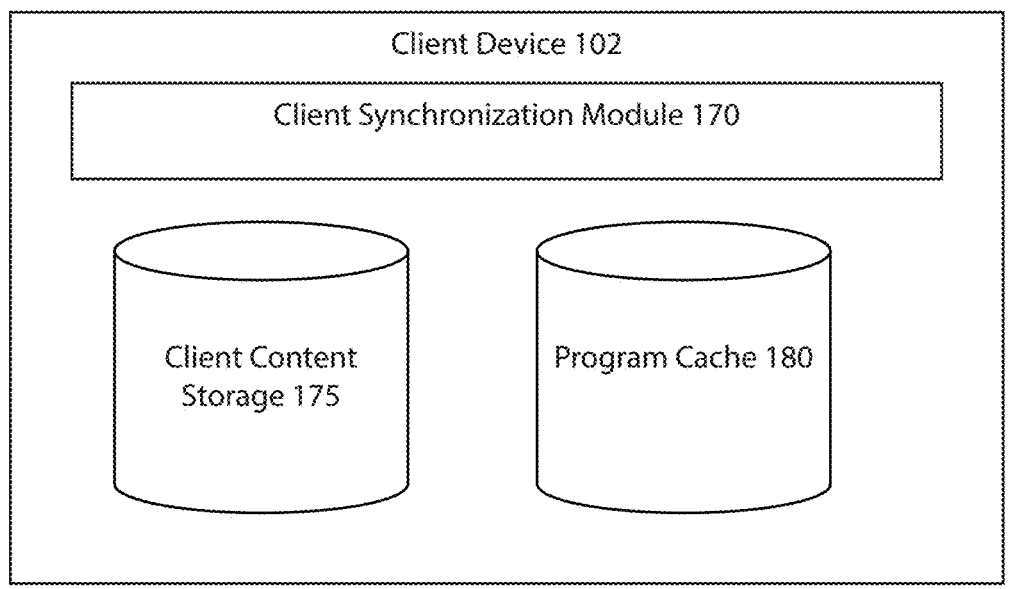

While content management system 106 is presented with specific components, it should be understood by one skilled in the art, that the architectural configuration of system 106 is simply one possible configuration and that other configurations with more or fewer components are possible. For example, FIG. 1B, which is described in view of FIG. 1A, shows one example embodiment of client device 102 including client synchronization module 170, client content storage 175, and program cache 180. Client synchronization module 170 can be a process, application, or instructions executed by client device 102. Client content storage 175 can store content items as well as other items (e.g., programs). In some embodiments, client synchronization module 170 utilizes program cache 180 to store data and items; in some embodiments, program cache 180 is primarily only accessed by client synchronization module 170. Program cache 180 can be located within client device 102 storage such that if content synchronization 170 crashes, program cache 180 can remain.

Figure 2:
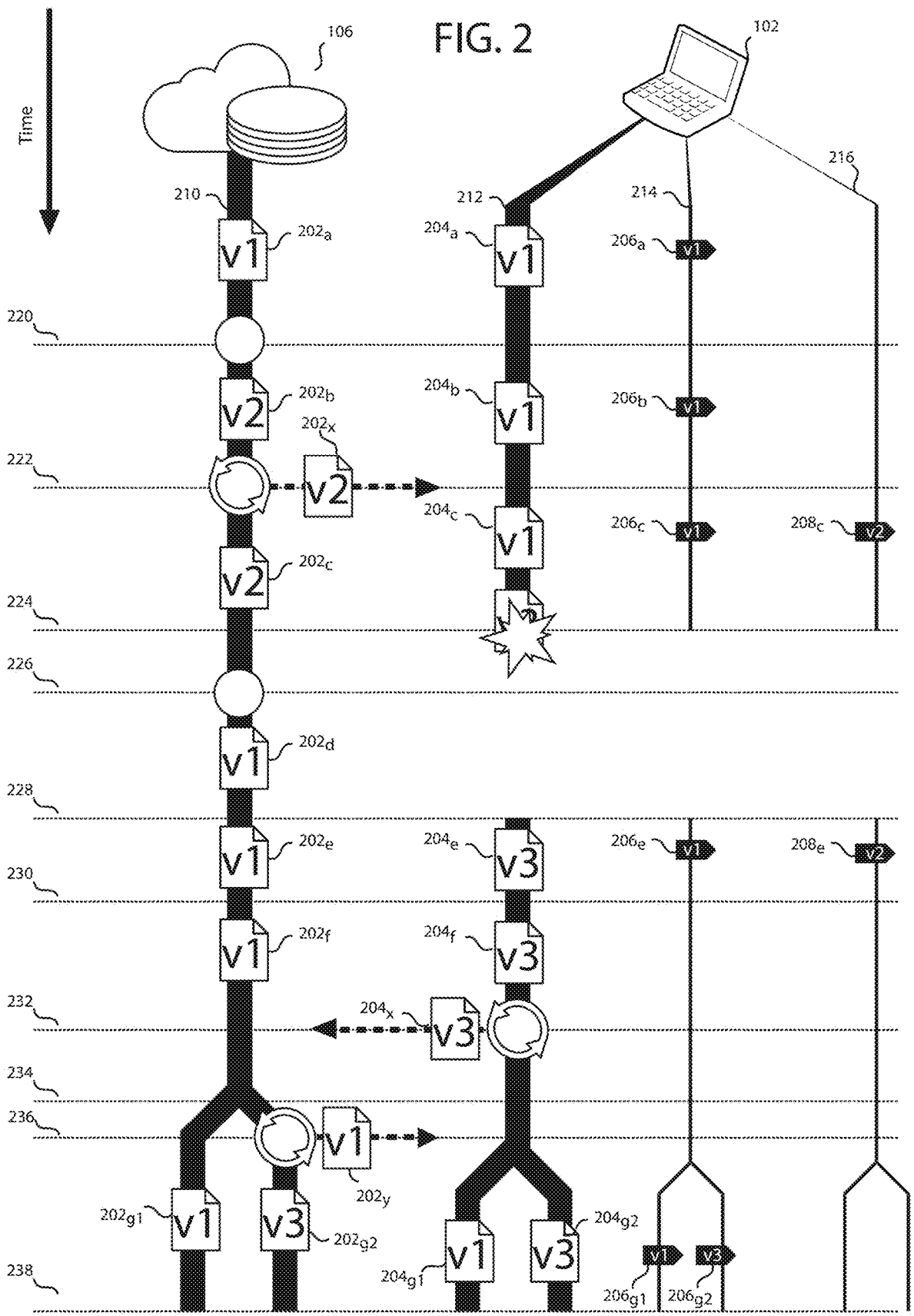
FIG. 2 shows a timeline of an example synchronization interruption according to some embodiments.

FIG. 2 shows a timeline showing various features of some embodiments. Times 220, 222, 224, 226, 228, 230, 232, 234, 236, and 238 represent different periods of time of this example scenario. Server content item 202 (represented by server content items $202_a$-$202_y$) can be a content item on content management system 106 that is synchronized with client content item 204 (represented by client content items $204_a$-$204_x$). Client content item 204 can be a content item on client device 102. Timelines 210, 212, 214, and 216 each track the state of server content item 202, client content item 204, tag 206, and indicator 208, respectively over time. In some embodiments, client synchronization module 170 can maintain client content item 204, tag 206, and indicator 208 on client device 102.

Tag 206 (represented by tags $206_a$-$206_{g2}$) can be a description of the last synchronized version of client content item 204. Tag 206 can be updated after every successful synchronization with content management system 106. Tag 206 can be stored on client device 102 (e.g., in cache 180, as metadata to content item 204, as a copy of client content item 204 at the time it is synchronized, etc.). In some embodiments, tag 206 is stored on content management system 106. As used herein, the term "description" of a content item can include (among other things) the content item's filename, file size, creation time, last edited time, authorship, sharing status, a hash (full or partial) of the content item, a complete or partial copy of the content item, etc., or any combination of the foregoing.

Before time 220, server content item $202_a$, client content item $204_a$, and tag $206_a$ are all at v1 (e.g., "version one") and are synchronized. Neither server content item $202_a$ nor client content item $204_a$ have changed since last synchronization. At time 220, server content item 202 might change to v2. As a result of the change, content management system 106 can send server content item 202 to client synchronization module 170 at time 222. Between time 222 and time 224, client synchronization module 170 can attempt to update client content item $204_c$ to server content item $202_x$. In some embodiments, it first records indicator $208_c$, then continues with the updating.

It should be understood that the terms "send" and "receive" (e.g., "content management system 106 can send server content item 202 to client synchronization module 170") can include updating or synchronizing a content item between entities. This can utilize an optimized synchronization procedure where an entity only sends the necessary portions (e.g., blocks) of the content item. For example, if a first entity (e.g., client synchronization module 170 or content management system 106) sends a content item to a second entity (e.g., client synchronization module 170 or content management system 106); this sending can entail the first entity transmitting only changes that have occurred since a prior synchronization. Thus, in some embodiments, an entity that "receives" a current version of a content item, might only receive data pertaining to the differences between the current version of content item and a previous version of the content item; the entity can then apply the received differences to the previous version of the content item to result in the current version of the content item.

Indicator 208 (represented by indicators $208_c$ and $208_e$) can be a representation of an attempt to update client content item $204_c$ to server content item $202_x$. Indicator 208 can contain a description of server content item $202_x$. After indicator $208_c$ is recorded, client synchronization module 170 can continue updating client content item $204_c$ to server content item $202_x$. In some embodiments, indicator 208 does not contain a description of sever content item $202_x$, instead it contains a Boolean (or similar) entry to indicate a synchronization operation is about to commence with client content item $204_c$. In some embodiments tag 206, indicator 208, client content item 204, server content item 202, or any combination of the foregoing are associated with each other because they have or describe a common filename of content item.

At time 224, client synchronization module 170 has not completed updating client content item $204_c$ and suffers an interruption. This interruption might be the result of a network disconnect, power outage, operating system crash, client synchronization software error, or any other interruption of the update procedure that puts client synchronization module 170 momentarily offline. In some embodiments, client device 102 might otherwise be functioning normally while client synchronization module 170 is offline. At time 226, while client synchronization module 170 is still offline, server content item $202_c$ is reverted to $202_d$. This could be the result of a user action, for example by undoing changes in server content item 202 or manually replacing server content item $202_c$ with the prior version.

When client synchronization module 170 comes back online at time 228, it can detect client content item $204_e$, tag $206_e$, and indicator $208_e$. In embodiments where client synchronization module 170 did not suffer an interruption at time 224 and had completed the updating of client content item $204_e$, it could then update tag 206 to describe its updated version and remove indicator $208_c$. In other embodiments (e.g., FIG. 2) the updating does not complete and indicator $208_e$ remains. In some embodiments, when coming back online, client synchronization module 170 changes tag $206_e$ after detecting indicator $208_e$. This change to tag $206_e$ can be a deletion, removal, or update of tag $206_e$. In some embodiments, client synchronization module 170 compares the description contained in indicator $208_e$ with a description of client content item $204_e$. If the two descriptions match, client synchronization module 170 can change tag $206_e$ to describe client content item $204_e$. If the two descriptions do not match (as depicted in FIG. 2), client synchronization module 170 can take action to show that client content item $204_f$ has uncertain parentage. In other words, client content item $204_f$ might be a descendent of the version described by tag $206_e$ (v1, i.e., client content item $204_b$) or it might be a descendent of the version described by indicator $208_e$.

A match can be complete or partial. For example, if there are two descriptions of a content item, they might "match" only if every element of the descriptions is equivalent. Alternatively, they might match if at least an element of the descriptions is equivalent even if other elements do not match (e.g., a time of "last save" matches but not the file size).

As explained above, at time 230 client synchronization module 170 can determine that indicator $208_e$ exists and does not match client content item $204_e$. As a result, client synchronization module 170 can remove tag $206_e$ and indicator $208_e$ (thus establishing that client content item $204_f$ has uncertain parentage). At time 232, client synchronization module 170 can initiate a commit of client content item $204_x$. In some embodiments, client synchronization module 170 commits client content item $204_x$ without an indication of parentage. In some embodiments, a "commit" can refer to client synchronization module 170 synchronizing client content item 204 with content management system 106.

In some embodiments, client synchronization module 170 does not remove tag $206_e$ and/or indicator $208_e$ but instead retains tag $206_e$ and/or indicator $208_e$ as part of a file history of client content item $204_f$. In some such embodiments, client synchronization module 170 commits client content item $204_x$ along with at least a portion of the file history of client content item 204.

In some embodiments, upon receipt of client content item $204_x$ at time 232, content management system 106 can either update server version $202_f$ to client content item $204_x$ or conflict the two versions. In FIG. 2, at time 234 content management system 106 decides to conflict the versions. It can make this decision based on the synchronization history (or lack thereof) of client content item $204_x$. For example, if client synchronization module 170 sent tag 206 describing v1 of the content item along with client content item $204_x$, content management system 106 could determine that tag 206 matched server content item $202_f$. It can then update server content item $202_f$ to client content item $204_x$ because server content item $202_f$ has not been modified since the last synchronization. If no match was detected, content management system 106 can conflict the two versions. The term conflict means to retain both versions of a content item (e.g., server content item $202_f$ and client content item $204_x$) instead of having one update the other. For example, at time 236 content management system forks timeline 210 and subsequently maintains server content item $202_{g2}$ (i.e., v3 which is the version sent by client synchronization module 170 at time 232) and server content item $202_{g1}$ (i.e., v1 which is the version previously on content management system 106). After time 234, content management system 106 can maintain server content items $202_{g1}$ and $202_{g2}$ as distinct content items. In some embodiments, content management system 106 can rename one of the conflicted versions in order to fork timeline 210 (e.g., "filename_conflicted_version.ext").

At time 236, content management system 106 can synchronize server content item $202_y$ with client synchronization module 170. In some embodiments client device then detects client content item $204_f$ with no tag 206 and determines a conflict. In some embodiments, content management system 106 sends, along with server content item $202_y$, an instruction to rename client content item $204_f$ to match a name given to server content item $202_{g2}$ (e.g., "filename_conflicted_version.ext") resulting in client content item $204_{g2}$. In some embodiments, tag $206_e$ is then changed or created to match the new name so that as client synchronization module 170 receives server content item $202_y$, it will not have a corresponding tag 206 and it will then fork timeline 212. Client synchronization module 170 can then independently maintain both versions of client content item 202, namely client content items $204_{g1}$ and $204_{g2}$ with their respective tags $206_{g1}$ and $206_{g2}$. During later synchronization operations, indicator(s) 208 can be created to describe a synchronization that will occur and removed after synchronization is complete, as herein disclosed.

At time 238 both content management system 106 and client synchronization module 170 have forked their respective timelines 110 and 112. At this time, server content item $202_{g1}$ is synchronized with client content item $204_{g1}$ while server content item $202_{g2}$ is synchronized with client content item $204_{g2}$, as indicated by tags $206_{g1}$ and $206_{g2}$.

In some embodiments, there are various types of content item synchronization operations that can occur between client synchronization module 170 and content management system 106. In one operation, content management system 106 synchronizes a version of server content item 202 with client synchronization module 170. This typically happens after a change occurs on content management system 106 (e.g., a user changes server content item 202 using a web interface). After receiving server content item 202, client synchronization module 170 can determine if its version of client content item 204 has changed since last synchronization (e.g., by comparing client content item 204 and tag 206). If it has changed, client synchronization module 170 can conflict the two content items as occurs in time 236 of FIG. 2 (and then synchronize the conflicted version to content management system 106). If it has not changed since last synchronization, client device can update client content item 204 to be server content item 202 and change indicator 208 to describe the updated client content item 204.

In another synchronization operation, a change is detected on client synchronization module 170 (e.g., a user modifies client content item 206) and client synchronization module 170 commits the client content item 204 to content management system 106, along with a description of the last synchronized state of the content item (e.g., tag 206 or the "parent" of the content item). In some embodiments, client synchronization module 170 can synchronize client content item 204 without tag 206 to represent that client content item 204 was not synchronized previously. Synchronizing client content item 204 without tag 206 can, in some embodiments, guarantee conflict upon receipt by content management system 106. In other embodiments, content management system 106 only conflicts the content item if server content item 202 exists and client content item 204 does not match server content item 202, otherwise content management system 106 can accept the commit and, if necessary, create server content item 202. For example, in some embodiments, content management system can determine that client synchronization module 170 sent client content item 204 without tag 206 and, instead of conflicting, determine that client content item 204 matches server content item 204. Content management system can then "accept" the commit and not conflict the two content items.

In another synchronization operation, both client synchronization module 170 and content management system 106 independently detect no change has occurred with their respective content items. The synchronization operation can then complete without synchronizing server content item 202 to client synchronization module 170 or client synchronization module 170 committing client content item 204.

Figure 3A:
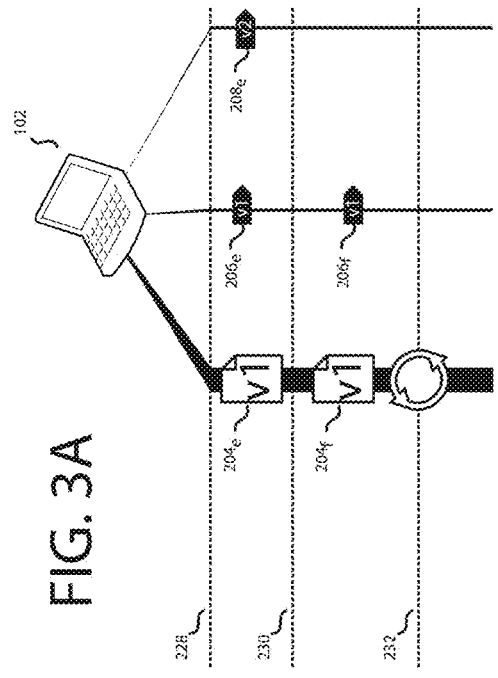
FIGS. 3A-3D show example synchronization interruption recovery techniques according to some embodiments.

FIGS. 3A-3D show how, according to various embodiments, client synchronization module 170 can return at time 228 from a synchronization interruption. In FIG. 3A, client device can detect (e.g., at time 230) that indicator 208$_e$ exists, which informs client synchronization module 170 that there was a synchronization interruption. In some embodiments, client synchronization module 170 can then compare client content item 204$_e$ with tag 206$_e$. Because client content item 204$_e$ and tag 206$_e$ match (e.g., both are v1), client synchronization module 170 can determine that server content item 202 did not fully or partially update client content item 204. In some such embodiments, client synchronization module 170 then retains tag 206$_f$ and removes indicator 208$_e$. At time 232, client synchronization module 170 can determine not to commit client content item 204$_f$ because no change has been made since last synchronization.

Figure 3B:
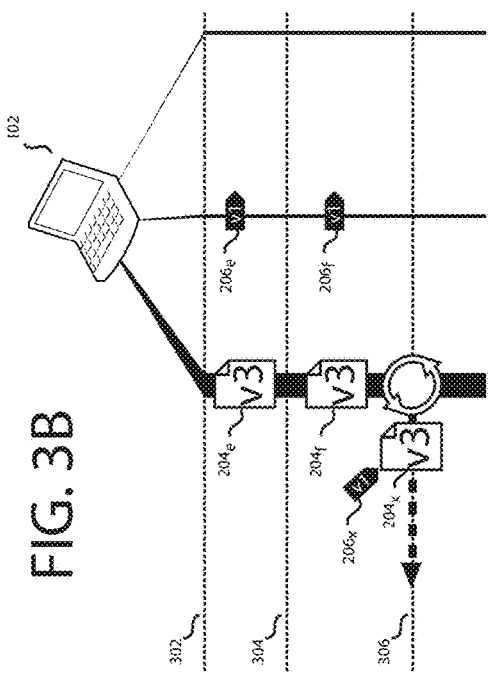

The scenario depicted in FIG. 3A has certain advantages (e.g., not committing a content item which might consume processing and network resources) but does carry some disadvantages. FIG. 3B shows an example scenario highlighting one disadvantage of the technique presented in FIG. 3A. Time 302 can represent a time subsequent to time 230 and before time 232 in FIG. 3A or a time when client synchronization module 170 first comes back online (e.g., time 228 of FIG. 2). Server content item 202 might have reverted back to v1 and client content item 204 might be changed to a new version (e.g., v3 in content item 204$_e$) while client synchronization module 170 was offline (as depicted at time 226 in FIG. 2). When synchronization occurs at 306, client synchronization module 170 can synchronize client content item 204$_x$ along with tag 206$_x$ to content management system 106. Because server content item 202 is at v1 (as a result of the user's reversion) and tag 206$_x$ is at v1, content management system 106 might accept the commit and update server content item 202 to match client content item 204$_x$. This can be undesirable because it does not respect the user action that reverted server content item 202. Further, if time 302 represents a time after coming back online, client content item 204$_e$ might be a corrupted version (as the result of a faulty synchronization). Synchronizing a corrupted version (v3) at time 306 with tag 206$_x$ is undesirable because there is a possibility that it might replace an uncorrupted version, even if there are limited cases in which content management system 106 might accept the commit (e.g., with a user reversion, as depicted in FIG. 2).

Figure 3C:
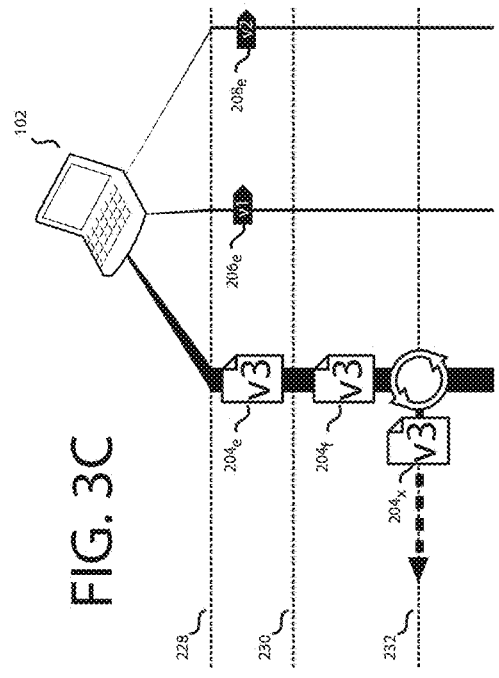

FIG. 3C shows how using indicator 208 can help prevent the aforementioned problem of possibly having a corrupted version of client content item 204 replace an uncorrupted version of server content item 202, according to various embodiments. Time 228 can represent a time when client synchronization module 170 comes back online after a synchronization interruption (e.g., time 224 of FIG. 2). The existence of indicator 208$_e$ can inform client synchronization module 170 of a prior synchronization interruption. As a result, client synchronization module 170 can remove tag 206$_e$. In some embodiments, tag 206$_e$ is removed, in other embodiments it is changed to describe client content item 204$_f$(v3). In some embodiments, tag 206$_e$ and indicator 208$_e$ are retained as part of the synchronization history of client content item 204. In some such embodiments, every time a synchronization occurs, the synchronization history is processed by content item 102. At time 232 client synchronization module 170 can commit client content item 204$_x$ to content management system 106 without tag 206. This will likely result in conflict. In some embodiments, client synchronization module 170 sends the synchronization history (e.g., tag 206$_e$ and indicator 208$_e$) of client content item 204$_x$ along with client content item 204$_x$.

Figure 3D:
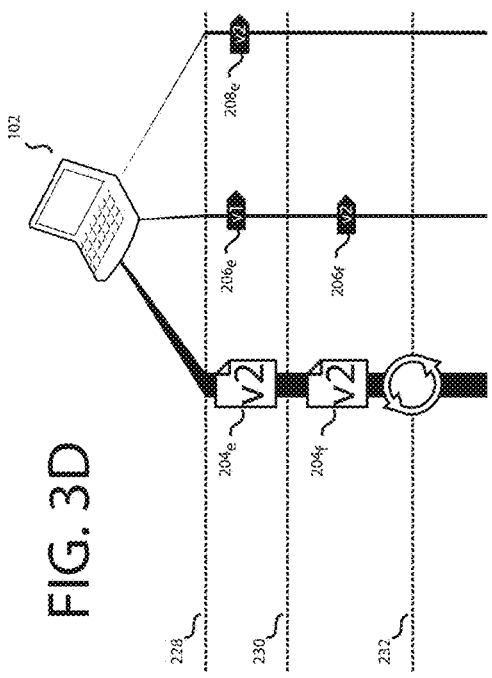

In some embodiments, if client synchronization module 170 detects indicator 208$_e$, it commits client content item 204$_x$ without tag 206$_e$, regardless of the version of client content item 204$_x$ (e.g., client content item 204$_x$ might be v1, v2, or v3). Alternatively, client synchronization module 170 can only commit client content item 204$_x$ without tag 206$_e$ if client content item 204$_e$ does not match indicator 208$_e$. If client content item 204$_d$ matches indicator 206$_e$, as depicted in FIG. 3D, client synchronization module 170 can determine that the interrupted synchronization completed updating client content item 204, but that tag 206 was not updated. In some such embodiments, client synchronization module 170 can update tag 206$_f$ to describe client content item 204$_f$. It would then be unnecessary to commit client content item 204$_f$ as it is already in a synchronized state. At time 232, if content management system were to synchronize a new version of the content item to client synchronization module 170, client synchronization module 170 would detect that tag 206$_f$ describes client content item 204$_f$ and determine that client content item 204$_f$ has not changed since it was last synchronized. As a result, client synchronization module 170 would accept the new version and update client content item 204$_f$ to the version it receives from content management system 106.

Figure 4:
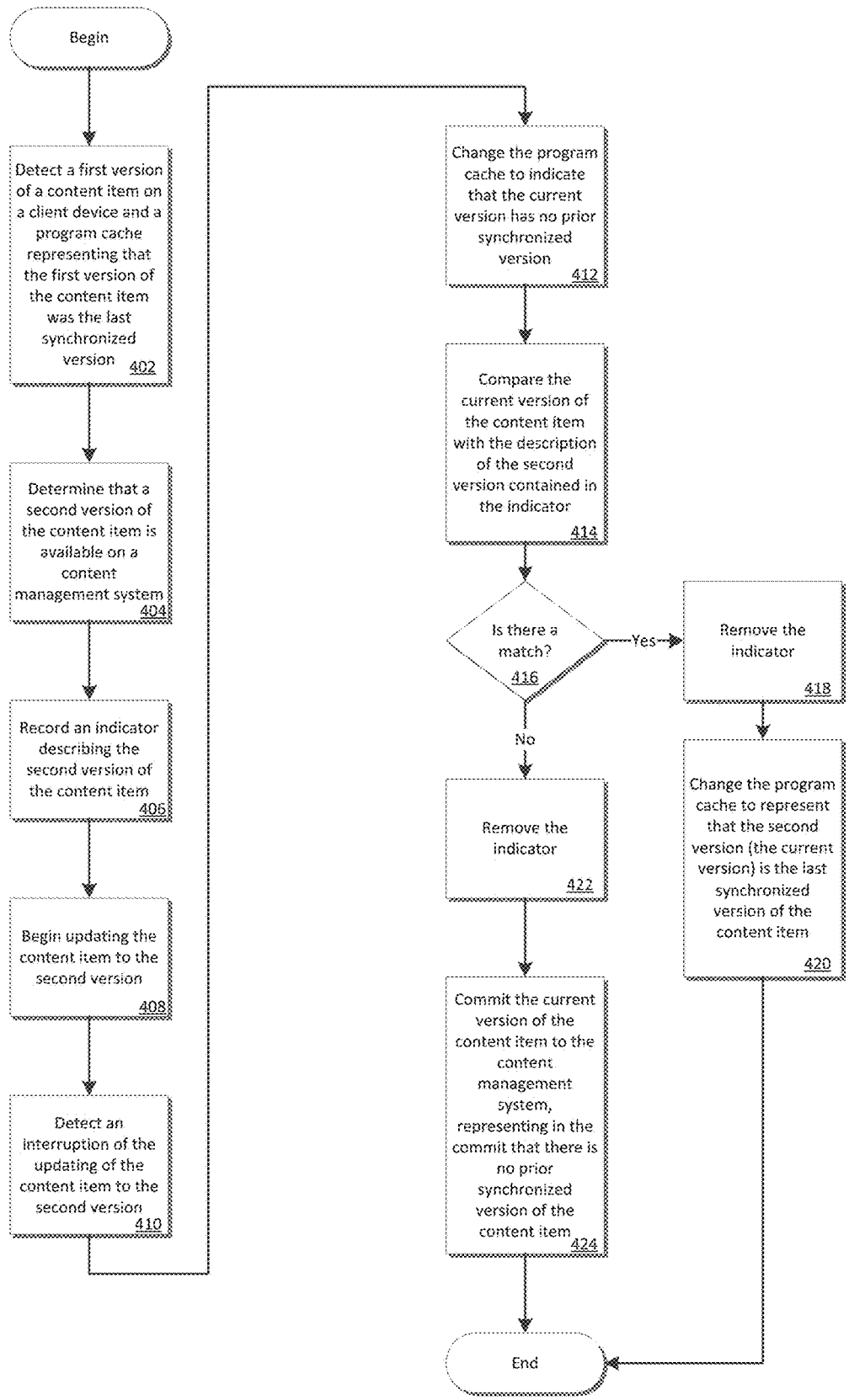
FIG. 4 shows an example flowchart describing a method for synchronization interruption detection and recovery according to some embodiments.

FIG. 4 depicts an example flowchart 400 according to some embodiments. In some embodiments, client synchronization module 170 performs the method outlined in flowchart 400. Alternatively, content management system 106 or another entity can perform some or all of the steps in flowchart 400 in to assist client synchronization module 170. At step 402, client synchronization module 170 can detect a first version of a content item (e.g., client content item 204$_a$ in FIG. 2) on a client device (e.g., client device 102) and program cache 180 representing that the first version of the content item was the last synchronized version (e.g., tag 206$_a$). Flowchart 400 continues and client synchronization module 170 can, at step 404, determine that a second version of the content item (e.g., 202$_x$) is available on a content management system (e.g., content management system 106). This can be the result of client synchronization module 170 initiating a synchronization session or content management system 106 detecting a change and notifying client synchronization module 170. Next, client synchronization module 170 can, at step 406, record an indicator describing the second version of the content item (e.g., indicator 208$_c$). In some embodiments, step 406 includes recording an entry in program cache 180, alongside the description detected in step 402 (i.e., indicator 208 can be recorded alongside or within tag 206). At 408, client synchronization module 170 can begin updating the content item to the second version.

At this point in flowchart 400, between steps 408 and 410, something external or internal might occur to interrupt the updating commenced in step 408. At step 410 client synchronization module 170 can detect an interruption of the updating of the content item to the second version. This detection can be done by detecting the existence of the indicator because in some embodiments it is removed upon successful updating/synchronization of a content item. In other embodiments, this detection is done by detecting the absence of an indicator or tag that would describe a completed updating/synchronization. For example, in some embodiments client synchronization module 170 records a second indicator after the completion of updating to represent that the updating is completed.

Flowchart 400 continues at step 412 where client synchronization module 170 can change program cache 180 to indicate that the current version (e.g., the version currently stored on client device 102) has no prior synchronized version. In some embodiments, step 412 includes deleting a relevant entry in program cache 180, though alternative approaches are effective (e.g., recording another entry in program cache 180 representing that the previous entry is incorrect). At step 414, client synchronization module 170 can compare the current version of the content item, or a description of the current version of the content item, with the description of the second version contained in the indicator. At step 416, flowchart 400 hits a junction based upon the comparison in step 414, if there is a match between the current version of the content item and the description contained in the indicator, flowchart 400 continues at step 418; if there is not a match, flowchart 400 continues at step 422. In some embodiments, a partial match can be sufficient to constitute a match. For example, a hash of the current content item matches the indicator but other attributes fail to match the indicator.

After determining a match, client synchronization module 170 can remove indicator 208 at step 418. In some embodiments, client synchronization module 170 instead changes indicator 208 or otherwise represents that the updating/synchronization was successful. Client synchronization module 170 can then, in step 420, change program cache 180 to represent that the second version (e.g., the current version) is the last synchronized version of the content item. In some embodiments, step 412 is not performed according to this path. For example, step 412 can be performed only if there is not a match at step 416. In some embodiments, step 420 includes changing the relevant entry in program cache 180, though alternative approaches are effective (e.g., recording a new entry in program cache 180 representing that the previous entry is incorrect).

If there is not a match at step 416, client synchronization module 170 can remove the indicator at step 422. In some embodiments, client synchronization module 170 instead changes indicator 208 or otherwise represents that the updating/synchronization was unsuccessful and to represent that the current version of the content item has an uncertain synchronization history. Client synchronization module 170 can then, at step 424, commit the current version of the content item to the content management system, representing in the commit that there is no prior synchronized version of the content item. In some embodiments this representation that there is no prior synchronized version of the content item is done explicitly (e.g., "prior_version=FALSE") or implicitly (e.g., by remaining silent on prior synchronization history). In many cases, this will result in the content management system determining a conflict exists between the server content item and the client content item it receives.

Figure 5A:
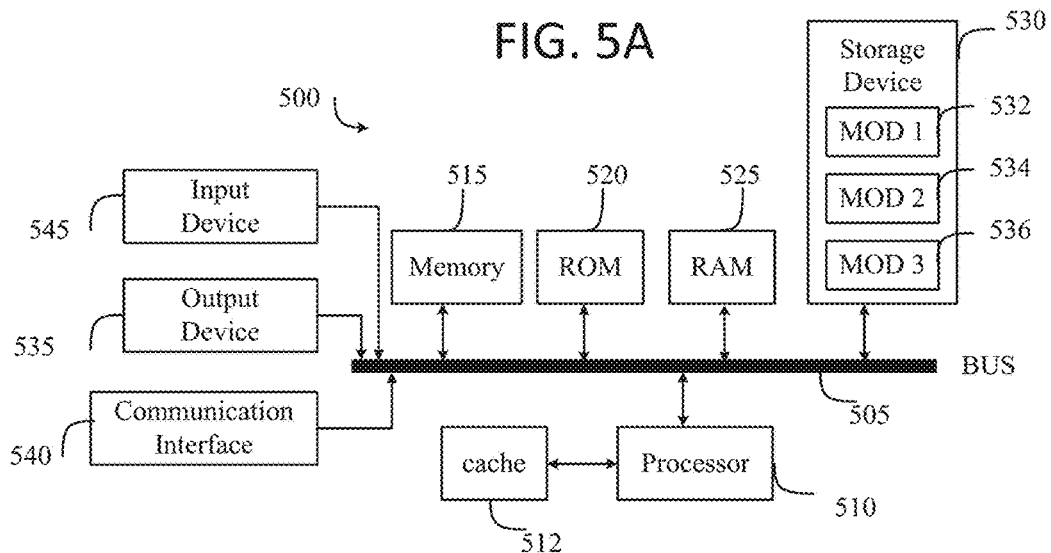
FIG. 5A shows an example possible system embodiment for implementing various embodiments of the present technology.
Figure 5B:
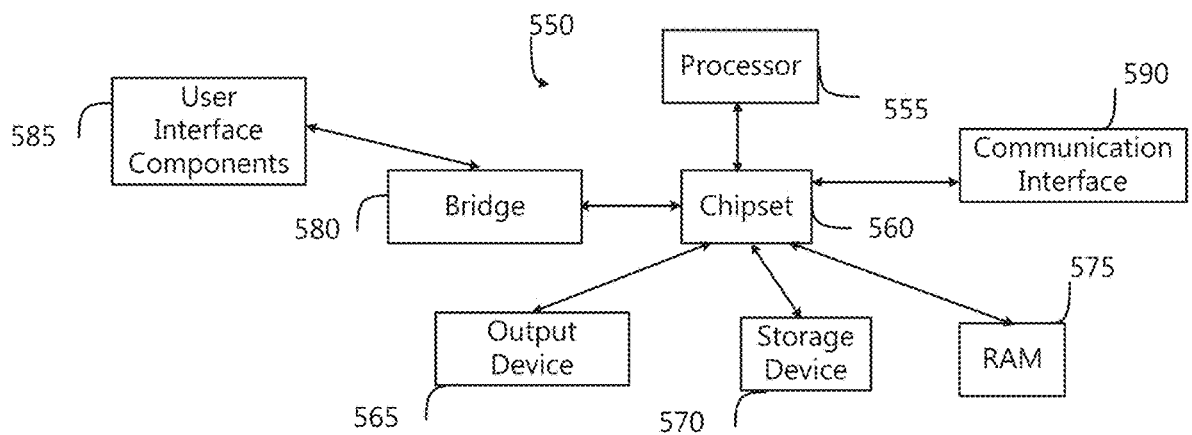
FIG. 5B shows an example possible system embodiment for implementing various embodiments of the present technology.

5A and FIG. 5B show example possible system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical communication with each other using a bus 505. Example system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
    recording, at a client device, a tag representing a first version of a content item stored at the client device and associated with a last completed synchronization;
    initiating an update of the first version of the content item to a second version of the content item via a first synchronization between the client device and a content management system;
    recording, at the client device, an indicator when the first synchronization initiates, the indicator containing at least a partial copy of the second version and representing that the first synchronization has initiated wherein the indicator remains on the client device after the first synchronization has ended to indicate that the first synchronization was interrupted, wherein the indicator including the at least the partial copy is recorded in the tag;
    after the first synchronization was interrupted, determining a third version of the content item as being a most current version of the content item on the client device, wherein the third version is different from the first version and the second version;
    determining that the at least the partial copy of the second version of the content item in the indicator does not match at least another partial copy of the most current version of the content item on the client device, which indicates that the most current version of the content item has uncertain parentage; and in response to the determination, removing the tag and the indicator and synchronizing the most current version at the client device with the content management system while representing to the content management system that the most current version of the content item has no prior synchronized version and storing the most current version without replacing the second version of the content item at the client device.

2. The computer-implemented method of claim 1, wherein changing the indicator to represent that the updating was successful comprises removing the indicator from the client device.

3. The computer-implemented method of claim 1, further comprises:
 sending, with the most current version of the content item, a synchronization history of the first version of the content item to the content management system, the synchronization history including the removed tag including at least a second partial copy of the first version of the content item from a cache and the removed indicator including the at least the second partial copy of the second version of the content item.

4. A non-transitory computer-readable medium storing computer executable instructions which, when executed by one or more processors, cause a computer to:
 record, at a client device, a tag representing a first version of a content item stored at the client device and associated with a last completed synchronization;
 initiate an update of the first version of the content item to a second version of the content item via a first synchronization between the client device and a content management system;
 record, at the client device, an indicator when the first synchronization initiates, the indicator containing at least a partial copy of the second version and representing that the first synchronization has initiated wherein the indicator remains on the client device after the first synchronization has ended to indicate that the first synchronization was interrupted, wherein the indicator including the at least the partial copy is recorded in the tag;
 after the first synchronization was interrupted, determine a third version of the content item as being a most current version of the content item on the client device, wherein the third version is different from the first version and the second version;
 determine that the at least the partial copy of the second version of the content item in the indicator does not match at least another partial copy of the most current version of the content item on the client device, which indicates that the most current version of the content item has uncertain parentage; and
 in response to the determination, remove the tag and the indicator and synchronizing the most current version at the client device with the content management system while representing to the content management system that the most current version of the content item has no prior synchronized version and storing the most current version without replacing the second version of the content item at the client device.

5. The non-transitory computer-readable medium of claim 4, wherein change the indicator to represent that the updating was successful comprises instructions which, when executed by the one or more processors, cause the computer to remove the indicator.

6. The non-transitory computer-readable medium of claim 4, wherein the instructions which, when executed by the one or more processors, cause the computer to:
 send a synchronization history of the first version of the content item to the content management system, the synchronization history including a second description of the first version of the content item from a cache and the description of the second version of the content item from the indicator.

7. A system comprising:
 one or more processors; and
 at least one computer readable medium storing computer readable instructions that, when executed by the one or more processors are effective to cause a client device to:
 record, at a client device, a tag representing a first version of a content item stored at the client device and associated with a last completed synchronization;
 initiate an update of the first version of the content item to a second version of the content item via a first synchronization between the client device and a content management system;
 record, at the client device, an indicator when the first synchronization initiates, the indicator containing at least a partial copy of the second version and representing that the first synchronization has initiated wherein the indicator remains on the client device after the first synchronization has ended to indicate that the first synchronization was interrupted, wherein the indicator including the at least the partial copy is recorded in the tag;
 after the first synchronization was interrupted, determine a third version of the content item as being a most current version of the content item on the client device, wherein the third version is different from the first version and the second version;
 determine that the at least the partial copy of the second version of the content item in the indicator does not match at least another partial copy of the most current version of the content item on the client device, which indicates that the most current version of the content item has uncertain parentage; and
 in response to the determination, remove the tag and the indicator and synchronizing the most current version at the client device with the content management system while representing to the content management system that the most current version of the content item has no prior synchronized version and storing the most current version without replacing the second version of the content item at the client device.

8. The system of claim 7, wherein change the indicator to represent that the updating was successful the instructions further comprise:
 change a cache to represent that the second version of the content item is a last synchronized version of the content item.

9. The computer-implemented method of claim 1, wherein determining that the updating of the first version of the content item to the second version of the content item via the first synchronization was interrupted is based on a presence of the indicator on the client device.

10. The computer-implemented method of claim 1, wherein the client device receives an indication that the second version of the content item is stored on the content management system, and wherein the indicator is created at the client device in response to the indication that the second version of the content item is available at the content management system.

11. The non-transitory computer-readable medium of claim 4, wherein determining that the updating of the first version of the content item to the second version of the content item via the first synchronization was interrupted is based on a presence of the indicator on the computer.

12. The non-transitory computer-readable medium of claim 4, wherein the computer receives an indication that the second version of the content item is stored on the content management system, and wherein the indicator is created at the computer in response to the indication that the second version of the content item is available at the content management system.

13. The system of claim 7, wherein determining that the updating of the first version of the content item to the second version of the content item via the first synchronization was interrupted is based on a presence of the indicator on the client device.

14. The system of claim 7, wherein the client device receives an indication that the second version of the content item is stored on the content management system, and wherein the indicator is created at the client device in response to the indication that the second version of the content item is available at the content management system.

15. The computer-implemented method of claim 1 further comprising:
changing a cache to represent that the second version of the content item is a last synchronized version of the content item.

16. The computer-implemented method of claim 1, further comprising:
sending a synchronization history of the first version of the content item to the content management system, the synchronization history including a second description of the first version of the content item from a cache and the description of the second version of the content item from the indicator.

17. The system of claim 7, wherein the one or more processors are effective to further cause the client device to:
send a synchronization history of the first version of the content item to the content management system, the synchronization history including a second description of the first version of the content item from a cache and the description of the second version of the content item from the indicator.

18. The non-transitory computer-readable medium of claim 4, wherein the instructions which, when executed by the one or more processors, cause the computer to:
change a cache to represent that the second version of the content item is a last synchronized version of the content item.

19. The non-transitory computer-readable medium of claim 4, wherein a determination that the update of the first version of the content item to the second version of the content item via the first synchronization was interrupted is based on a presence of the indicator on the client device.

20. The non-transitory computer-readable medium of claim 4, wherein the client device receives an indication that the second version of the content item is stored on the content management system, and wherein the indicator is created at the client device in response to the indication that the second version of the content item is available at the content management system.

* * * * *